US012676518B2

(12) United States Patent
Fujima et al.

(10) Patent No.: US 12,676,518 B2
(45) Date of Patent: Jul. 7, 2026

(54) ROTARY ELECTRICAL MACHINE AND VEHICLE DRIVING DEVICE INCLUDING ROTARY ELECTRICAL MACHINE

(71) Applicant: Hitachi Astemo, Ltd., Hitachinaka (JP)

(72) Inventors: Yuri Fujima, Tokyo (JP); Masahiro Hori, Tokyo (JP); Takaki Itaya, Hitachinaka (JP); Hideaki Goto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 211 days.

(21) Appl. No.: 18/726,250

(22) PCT Filed: Jul. 25, 2022

(86) PCT No.: PCT/JP2022/028644
§ 371 (c)(1),
(2) Date: Jul. 2, 2024

(87) PCT Pub. No.: WO2023/132093
PCT Pub. Date: Jul. 13, 2023

(65) Prior Publication Data
US 2025/0158460 A1     May 15, 2025

(30) Foreign Application Priority Data
Jan. 5, 2022    (JP) ................................. 2022-000395

(51) Int. Cl.
*H02K 1/20* (2006.01)
*H02K 1/32* (2006.01)
*H02K 5/10* (2006.01)
*H02K 7/00* (2006.01)

(52) U.S. Cl.
CPC ................. *H02K 1/20* (2013.01); *H02K 1/32* (2013.01); *H02K 5/10* (2013.01); *H02K 7/003* (2013.01); *H02K 7/006* (2013.01)

(58) Field of Classification Search
CPC .. H02K 1/20; H02K 1/32; H02K 5/10; H02K 9/19; H02K 2209/00
See application file for complete search history.

(56) References Cited

U.S. PATENT DOCUMENTS

| | | | |
|---|---|---|---|
| 2004/0080218 A1* | 4/2004 | Weidman ................. | H02K 1/32 310/61 |
| 2013/0038151 A1* | 2/2013 | Ohashi ................... | H02K 7/086 310/59 |

(Continued)

FOREIGN PATENT DOCUMENTS

| | | |
|---|---|---|
| JP | 2002-34206 A | 1/2002 |
| JP | 2016-179799 A | 10/2016 |

(Continued)

OTHER PUBLICATIONS

JP-6650982-B1 Machine Translation (Year: 2020).*

(Continued)

*Primary Examiner* — Oluseye Iwarere
*Assistant Examiner* — Masoud Vaziri
(74) *Attorney, Agent, or Firm* — Crowell & Moring LLP

(57) ABSTRACT

The purpose of the present invention is to provide a rotary electrical machine having improved cooling performance. A rotary electrical machine according to the present invention comprises: a stator 301; a rotor 302; and a cooling passage through which a refrigerant for cooling the stator 301 and the rotor 302 flows. The cooling passage is provided with: a refrigerant inlet 343 through which the refrigerant is introduced; stator cooling passages 3013 in communication with the refrigerant inlet 343; a rotor cooling passage 304; and a connection passage 315 which connects the stator cooling passages 3013 with the rotor cooling passage 304. The rotor cooling passage 304 is provided with refrigerant outlets 306a, 306b through which the refrigerant is discharged radially outside the rotor 302 in association with rotational (Continued)

CIRCUMFERENTIAL DIRECTION
AXIAL DIRECTION
VERTICAL DIRECTION
ANTI-LOAD SIDE
UP
LOAD SIDE
DOWN motion of the rotor 302. A plurality of the stator cooling passages 3013 are arranged in the circumferential direction of a stator core 3010. The terminal end of each of the stator cooling passages 3013 is connected to the upstream side of the connection passage 315 at a position opposite to the refrigerant inlet 343 in the axial direction and in the circumferential direction.

12 Claims, 14 Drawing Sheets

(56) References Cited

U.S. PATENT DOCUMENTS

2013/0119830 A1* 5/2013 Hautz ..................... H02K 9/00
310/60 R
2017/0197502 A1* 7/2017 Yukishima ............. H02K 7/006
2017/0271958 A1* 9/2017 Kitta ........................ H02K 9/19

FOREIGN PATENT DOCUMENTS

JP              6650982 B1 * 2/2020
WO      WO 2015/186466 A1    12/2015
WO      WO 2016/067352 A1     5/2016

OTHER PUBLICATIONS

International Search Report (PCT/ISA/210) issued in PCT Application No. PCT/JP2022/028644 dated Oct. 11, 2022 with English translation (5 pages).
Japanese-language Written Opinion (PCT/ISA/237) issued in PCT Application No. PCT/JP2022/028644 dated Oct. 11, 2022 with English translation (6 pages).

\* cited by examiner

UP

ANTI-LOAD SIDE ← → LOAD SIDE

DOWN

FIG. 3

CIRCUMFERENTIAL
DIRECTION

VERTICAL
DIRECTION

AXIAL DIRECTION

UP

ANTI-LOAD SIDE   LOAD SIDE

DOWN

CIRCUMFERENTIAL
DIRECTION

VERTICAL
DIRECTION

AXIAL DIRECTION

UP

ANTI-LOAD SIDE    LOAD SIDE

DOWN

ANTI-LOAD SIDE

UP

LOAD SIDE

DOWN

ANTI-LOAD SIDE   UP

DOWN   LOAD SIDE

CIRCUMFERENTIAL
DIRECTION

VERTICAL
DIRECTION

AXIAL DIRECTION

UP

ANTI-LOAD SIDE ← → LOAD SIDE

DOWN

ROTARY ELECTRICAL MACHINE AND VEHICLE DRIVING DEVICE INCLUDING ROTARY ELECTRICAL MACHINE

TECHNICAL FIELD

The present invention relates to a rotary electrical machine and a vehicle driving device including the rotary electrical machine.

BACKGROUND ART

As a technique for cooling a rotary electrical machine, for example, there is a technique disclosed in PTLs 1 to 3. In PTL 1, a rotor, a rotor shaft joined to the rotor, a stator disposed on an outer periphery of the rotor, and a housing disposed to cover an outer periphery of the stator are provided. The housing is provided with a coolant supply port. A first cooling passage through which the coolant supplied from the coolant supply port flows is formed between the housing and the stator. A second coolant passage is formed in the rotor shaft. One end of two branch passages is connected to the first cooling passage, and the other end of the two branch passages is connected to the second cooling passage. The rotary electrical machine is cooled by causing the coolant to flow through the first coolant passage and the second coolant passage branched from and connected to the first coolant passage.

In PTL 2, a rotary pump, an oil path disposed in a casing, and an oil path that is disposed in a motor rotary shaft and extends in an axial direction are provided. The oil path disposed in the casing extends in the axial direction in a state of extending radially outward from the rotary pump and being bent, extends radially inward in a state of being further bent, and is connected to an oil path disposed in the motor rotary shaft. An oil path that extends radially outward is connected to the oil path disposed in the motor rotation shaft. The oil path that extends radially outward is positioned radially outward and is connected to a holder portion that holds the rotor. An oil hole that is opened toward the coil of the stator is formed in the holder portion. A lubricating oil that is pressure-fed by the rotary pump passes through the oil path disposed in the casing, the oil path disposed in the motor rotary shaft, and the oil path extending radially outward, and then is discharged from the oil hole formed in the holder portion to cool the coil of the stator.

In PTL 3, a first storage portion is provided in an upper region of a center frame, a front frame, and a rear frame constituting a housing, and cooling oil that is pressure-fed from a pump is stored in the first storage portion. The cooling oil stored in the first storage portion is ejected from coil ejection holes provided in the front frame and the rear frame, and cools the stator and the bearing by the weight of the cooling oil.

CITATION LIST

Patent Literature

PTL 1: JP 6650982 B
PTL 2: JP 2016-179799 A
PTL 3: PCT International Publication No. 2016/067352

SUMMARY OF INVENTION

Technical Problem

In the technique disclosed in PTL 1, since the coolant is branched from the first cooling passage and introduced into the second cooling passage through the two branch passages, there is a problem that the flow rate of the coolant decreases and the cooling performance of the stator, the rotor, and the bearing constituting the rotary electrical machine deteriorates.

In the technique disclosed in PTL 2, the oil path is disposed in the casing, but it is not considered to cool the stator.

In the technique disclosed in PTL 3, since the stator and the bearing are cooled by the weight of the cooling oil, there is a problem that it is not possible to cause the cooling oil to uniformly flow, and the cooling performance of the stator and the bearing deteriorates.

An object of the present invention is to provide a rotary electrical machine with improved cooling performance and a vehicle driving device including the rotary electrical machine.

Solution to Problem

In order to achieve the above object, according to the present invention, a rotary electrical machine includes a stator; a rotor; and a cooling flow path through which a coolant for cooling the stator and the rotor flows. The cooling flow path includes a coolant introduction port into which the coolant is introduced, a stator cooling flow path that is formed in a stator core of the stator and communicates with the coolant introduction port, a rotor cooling flow path formed inside the rotor, and a connection flow path connecting the stator cooling flow path and the rotor cooling flow path. The rotor cooling flow path includes a coolant discharge port for discharging the coolant to an outer side of the rotor in a radial direction in accordance with rotational movement of the rotor. A plurality of the stator cooling a flow paths are disposed in circumferential direction of the stator core, and a terminal of each of the plurality of stator cooling flow paths is connected to an upstream side of the connection flow path at a position that is opposite to the coolant introduction port in an axial direction and opposite to the coolant introduction port in the circumferential direction.

Advantageous Effects of Invention

According to the present invention, it is possible to provide a rotary electrical machine with improved cooling performance and a vehicle driving device including the rotary electrical machine.

BRIEF DESCRIPTION OF DRAWINGS

FIG. 3 is a cross-sectional perspective view taken along line III-III of FIG. 2.

DESCRIPTION OF EMBODIMENTS

Hereinafter, embodiments of the present invention will be described with reference to the accompanying drawings. The same components are denoted by the same reference signs, and the same description will not be repeated.

The various components of the present invention do not necessarily need to be independent, and allow one component to be configured by a plurality of members, a plurality of components to be configured by one member, a certain component to be a portion of another component, a portion of one component and a portion of another component to overlap with each other, and the like.

Figure 1:
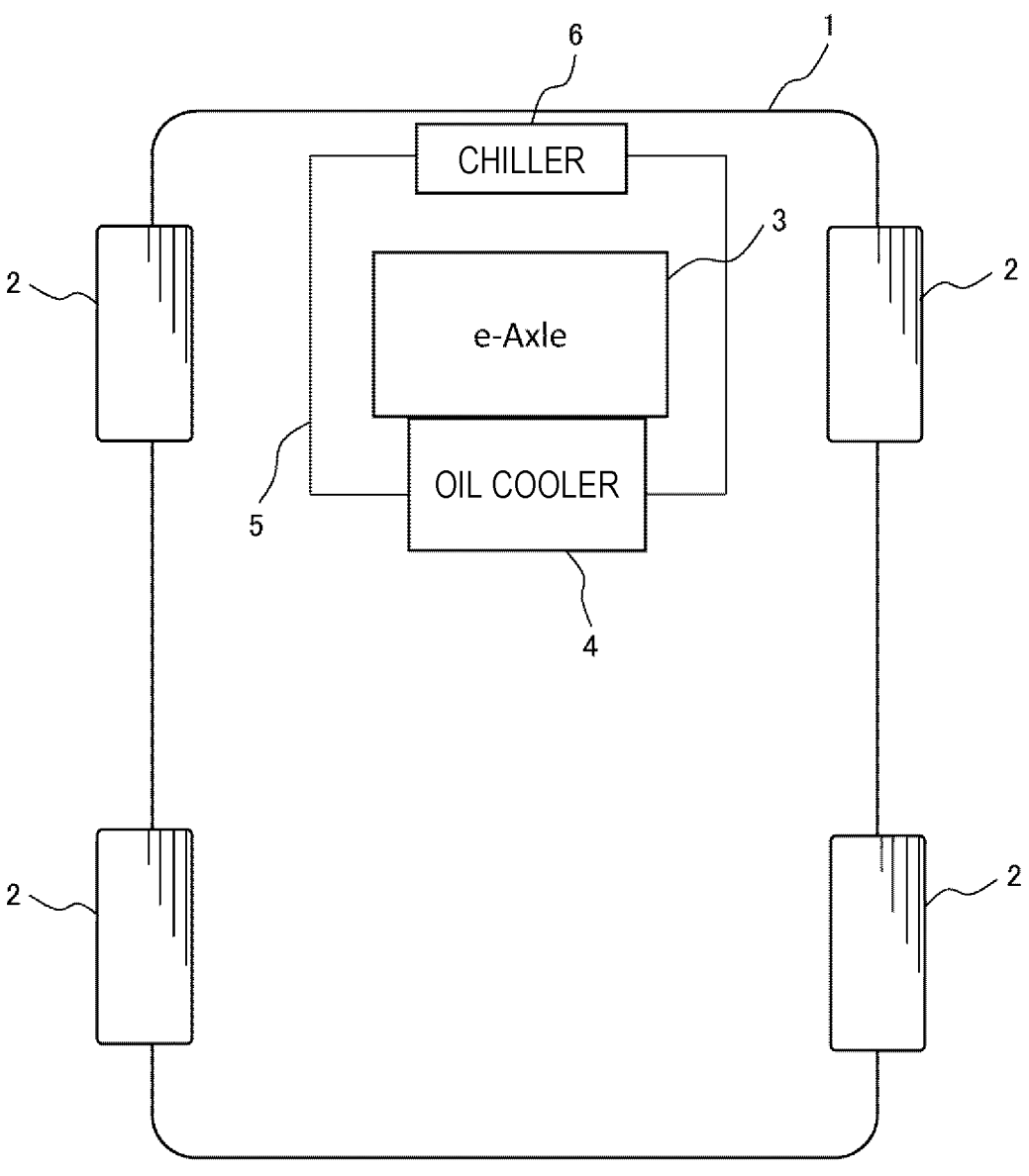
FIG. 1 is a schematic configuration diagram of an electric vehicle according to an embodiment of the present invention.

FIG. 1 is a schematic configuration diagram of an electric vehicle according to an embodiment of the present invention. In FIG. 1, an e-Axle unit 3 for driving wheels 2 is mounted on a vehicle body 1. The e-Axle unit 3 is a drive unit in which devices such as a motor and an inverter as a rotary electrical machine are integrated.

In the drawing, as indicated by arrows, a side on which the e-Axle unit 3 transmits a driving force is defined as a load side, the opposite side thereof is defined as an anti-load side, an upward direction is defined as an upper portion/upper side, and a downward direction is defined as a lower portion/lower side. In addition, a direction along a rotor shaft is defined as an axial direction, a circumference around the rotor shaft is defined as a circumferential direction, and a direction perpendicular to a horizontal line is defined as a vertical direction.

An oil cooler 4 is connected to the e-Axle unit 3. The oil cooler 4 is provided with a pump that pressure-feeds a coolant, and causes the coolant to flow to devices in the e-Axle unit 3 to cool these devices. In addition, the oil cooler 4 is connected to a chiller 6 through a pipe 5. After cooling the devices in the e-Axle unit 3, the coolant is sent to the chiller 6 via the pipe 5. In the chiller 6, the heated coolant is cooled by the traveling air when the vehicle travels. The cooled coolant is sent to the oil cooler 4 again.

Figure 2:
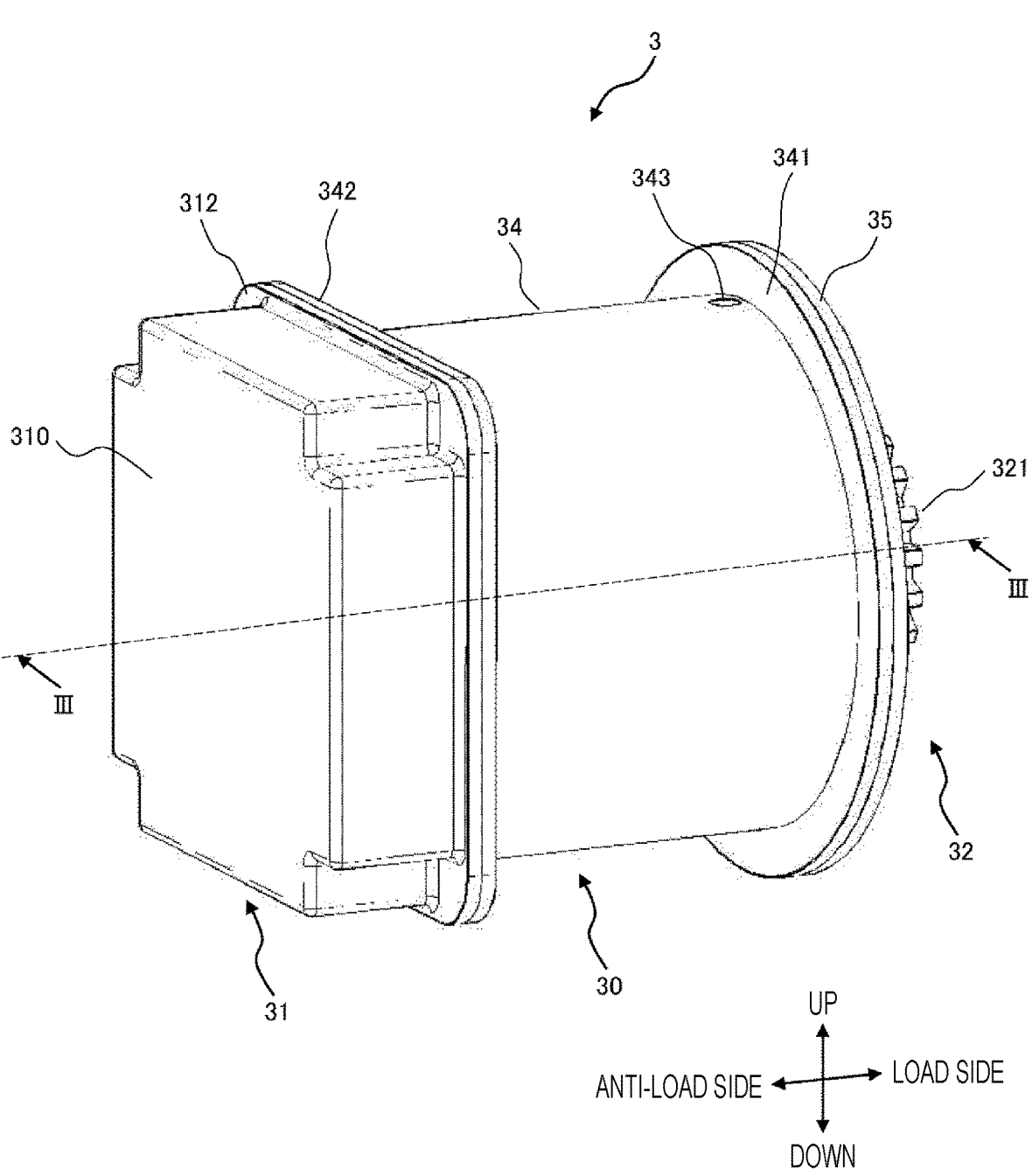
FIG. 2 is an external perspective view of an e-Axle unit according to the embodiment of the present invention when as viewed from an anti-load side.
Figure 3:
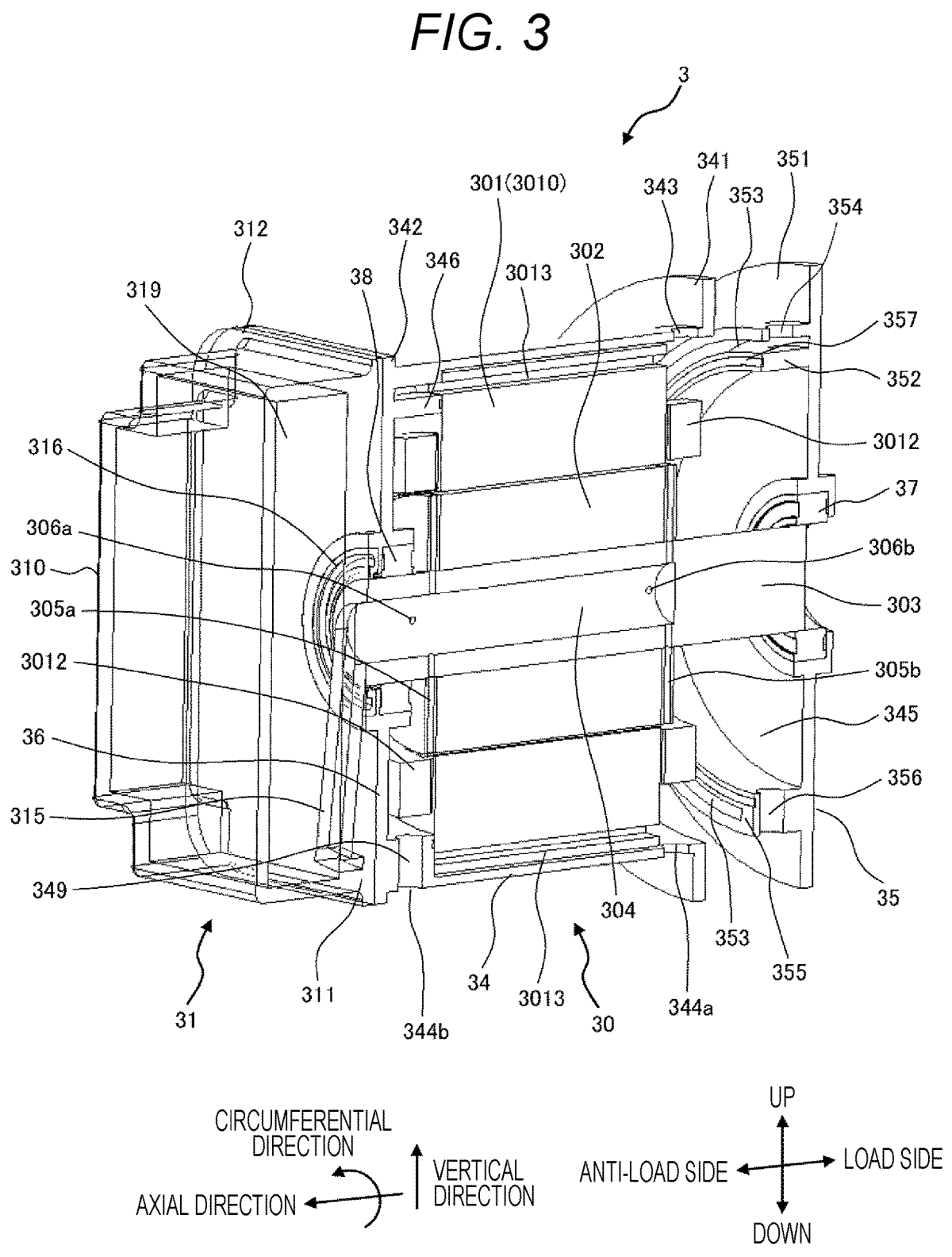
Figure 4:
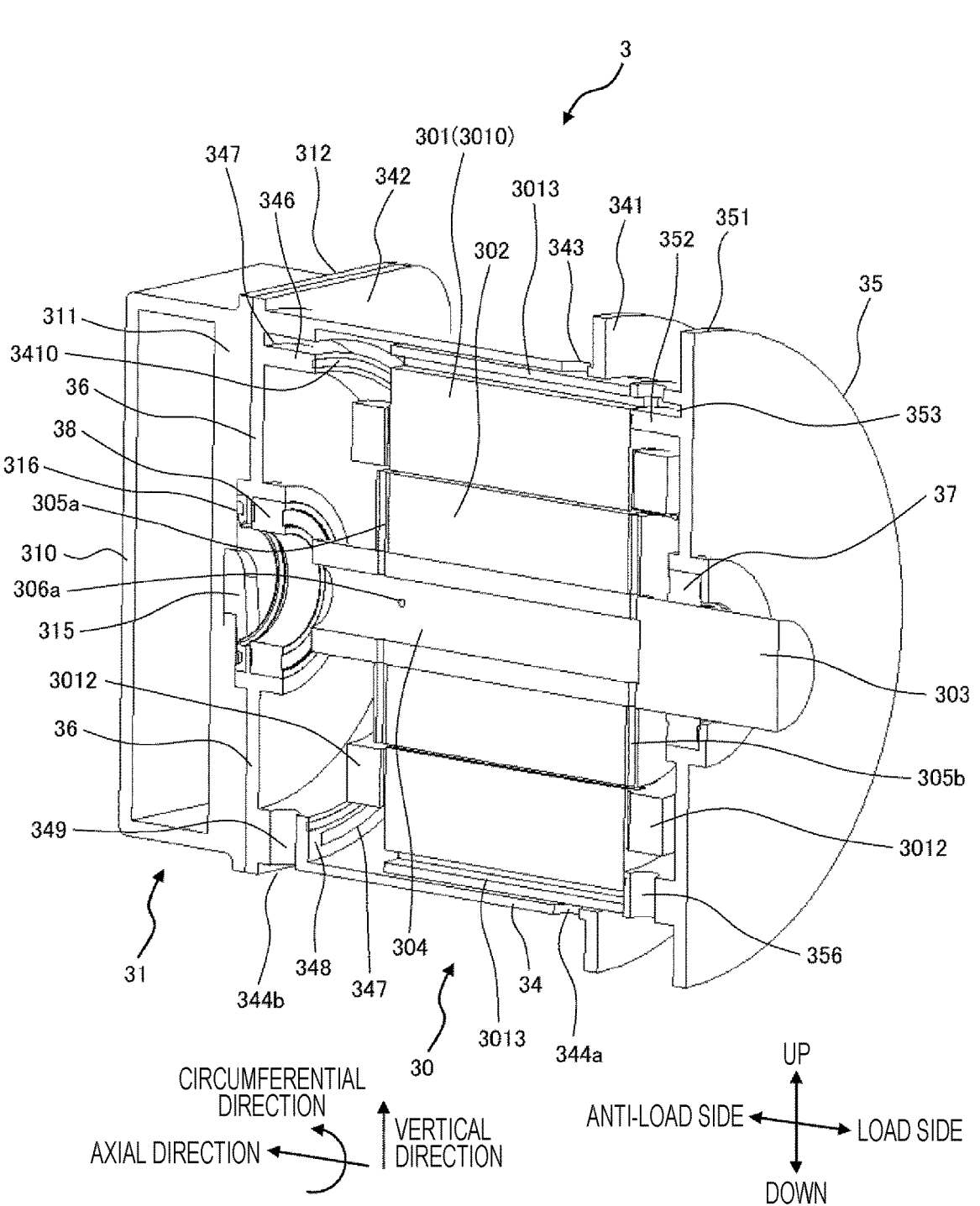
FIG. 4 is a cross-sectional perspective view of FIG. 3 as viewed from a load side.
Figure 5:
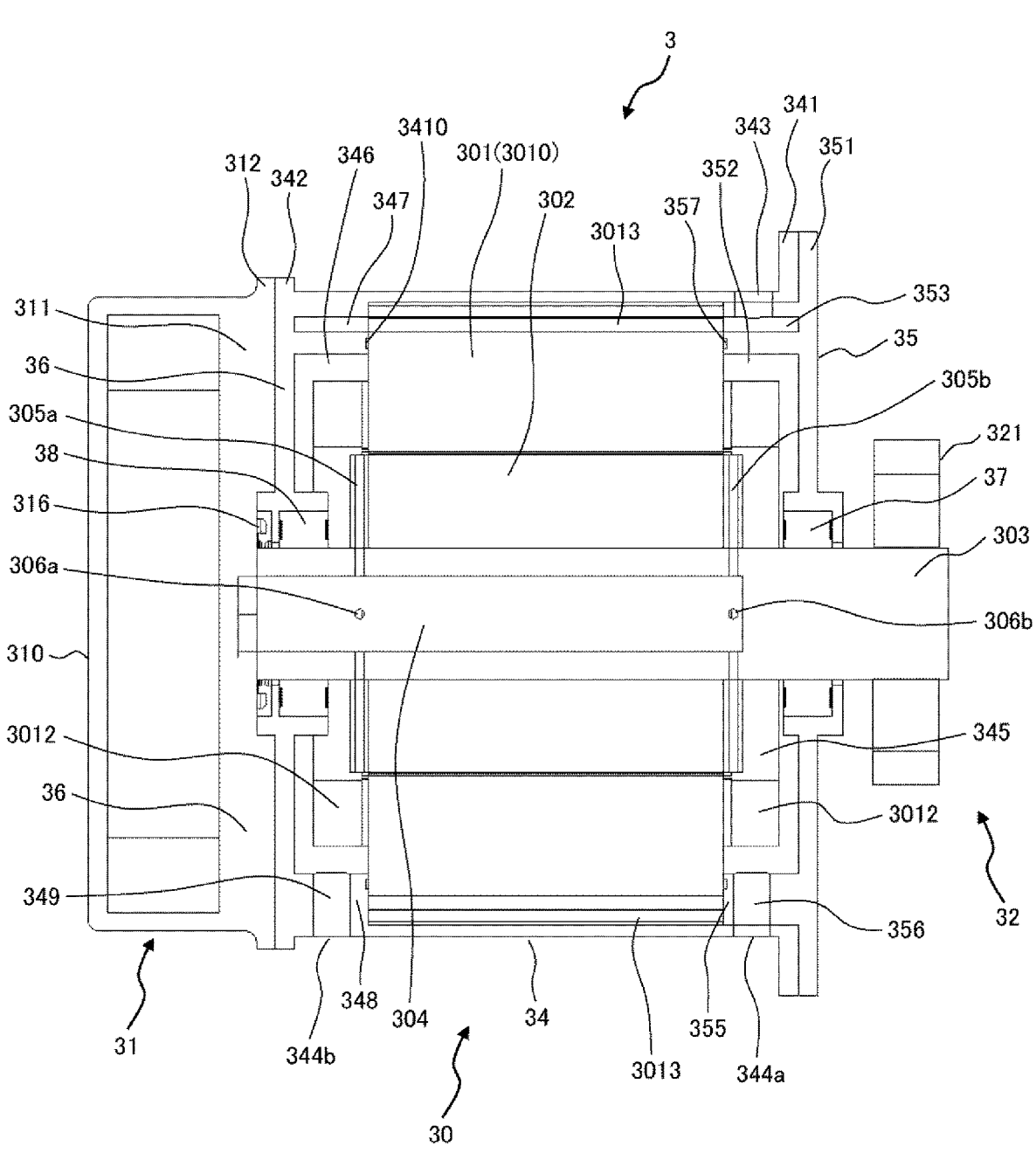
FIG. 5 is a cross-sectional view taken along line III-III of FIG. 2.
Figure 6:
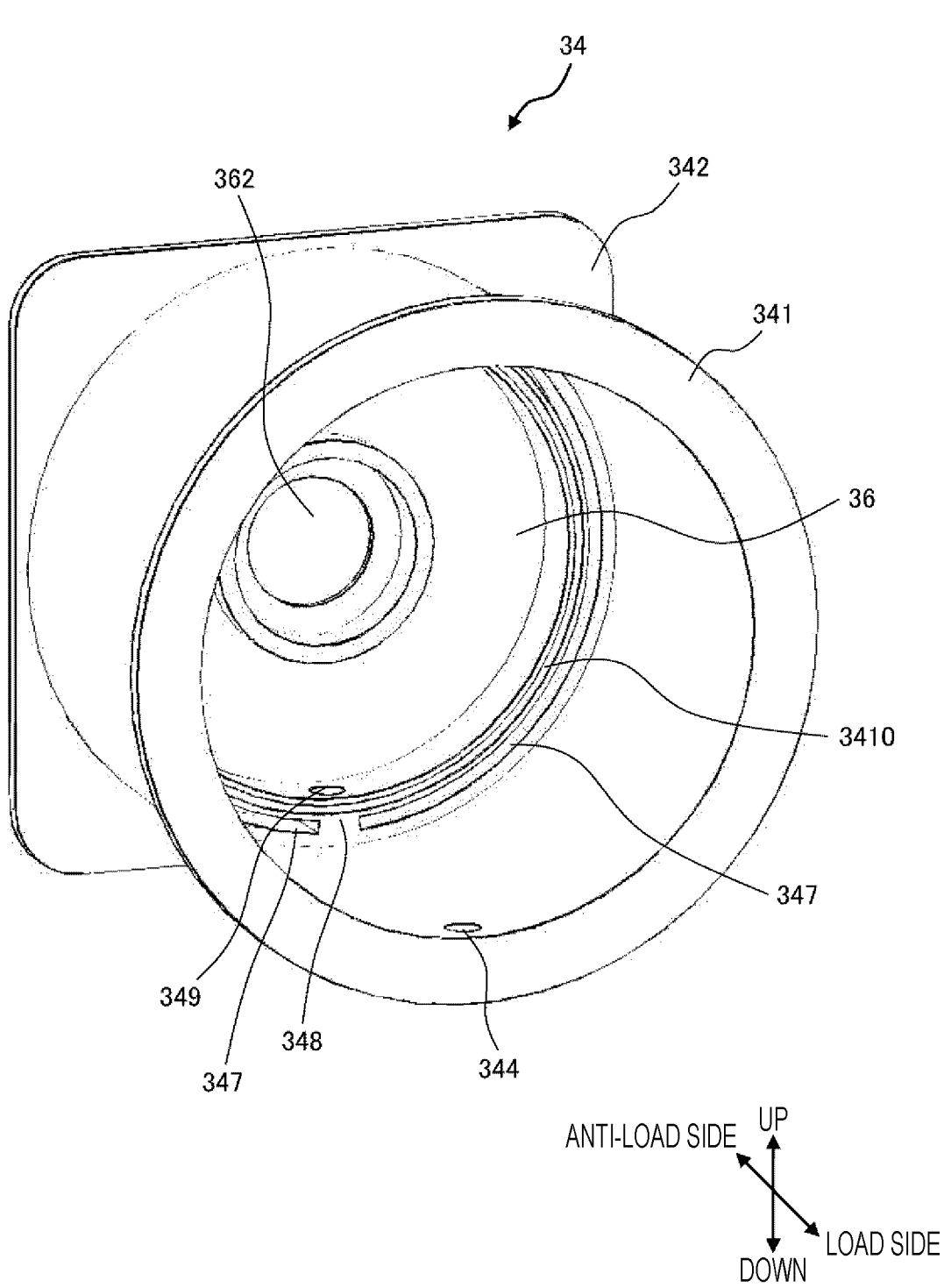
FIG. 6 is a perspective view of a motor housing according to the embodiment of the present invention as viewed from an open side.
Figure 7:
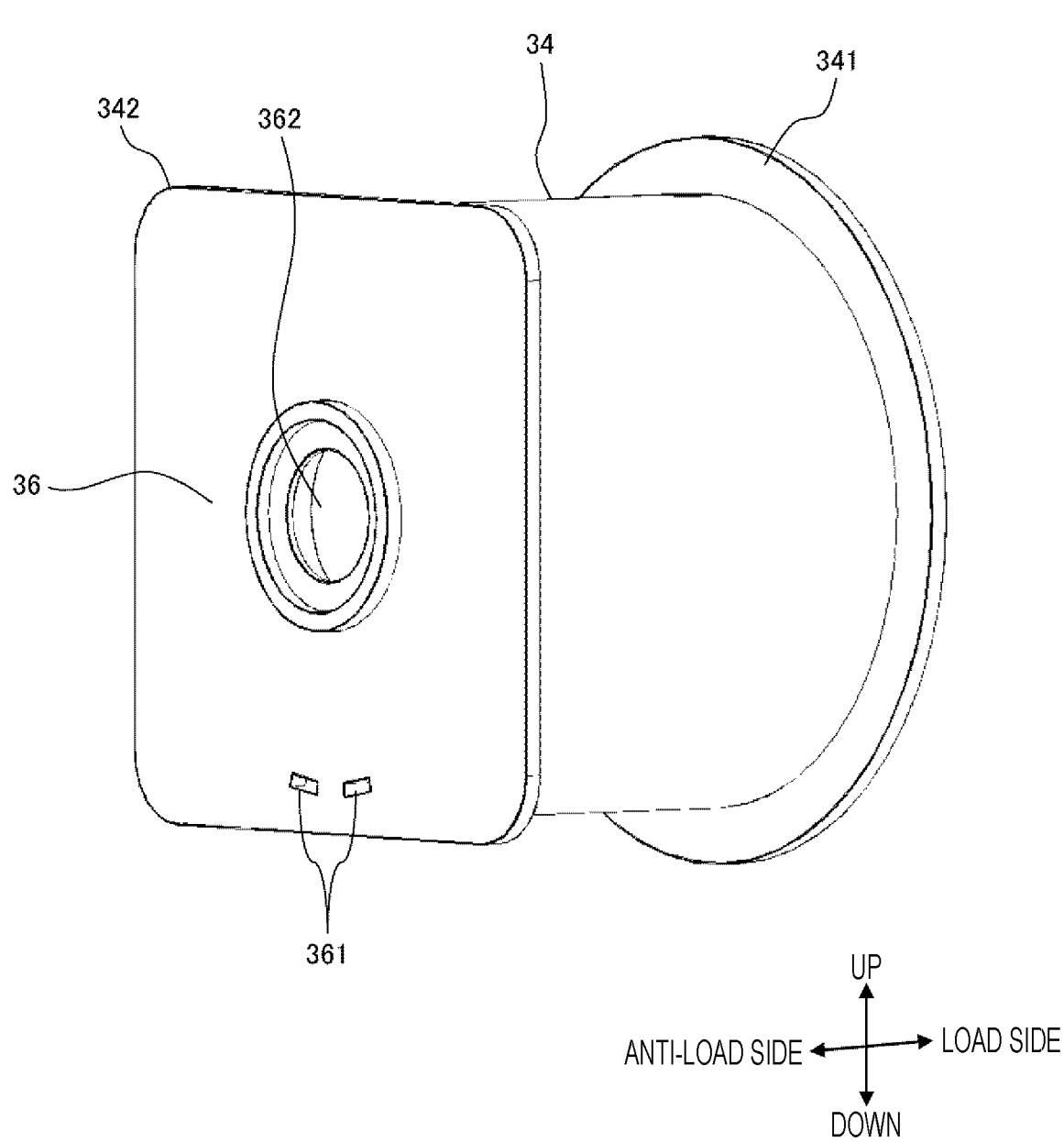
FIG. 7 is a perspective view of the motor housing according to the embodiment of the present invention as viewed from a motor housing bottom side.
Figure 8:
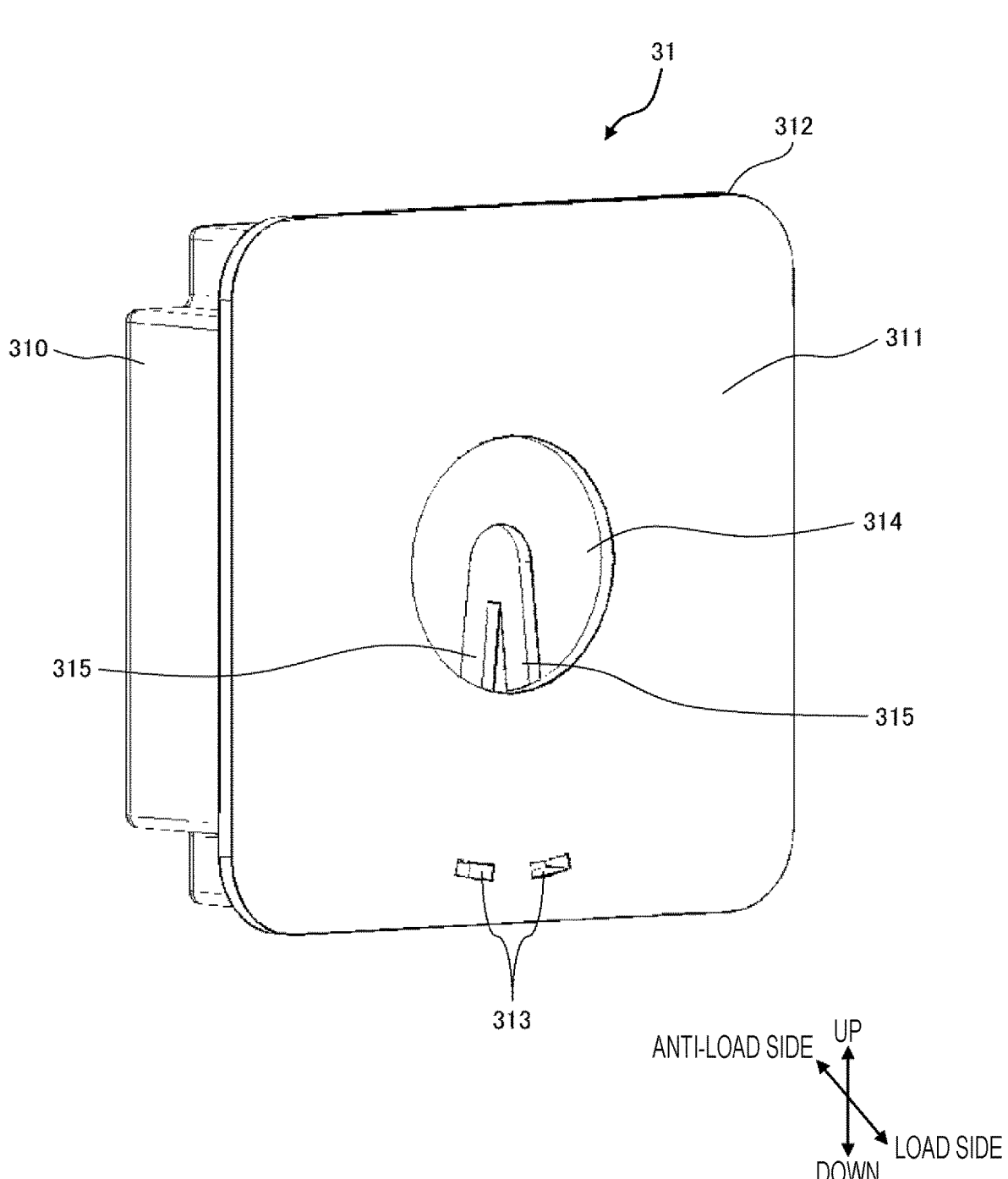
FIG. 8 is an external perspective view of an inverter unit according to the embodiment of the present invention as viewed from the load side.
Figure 9:
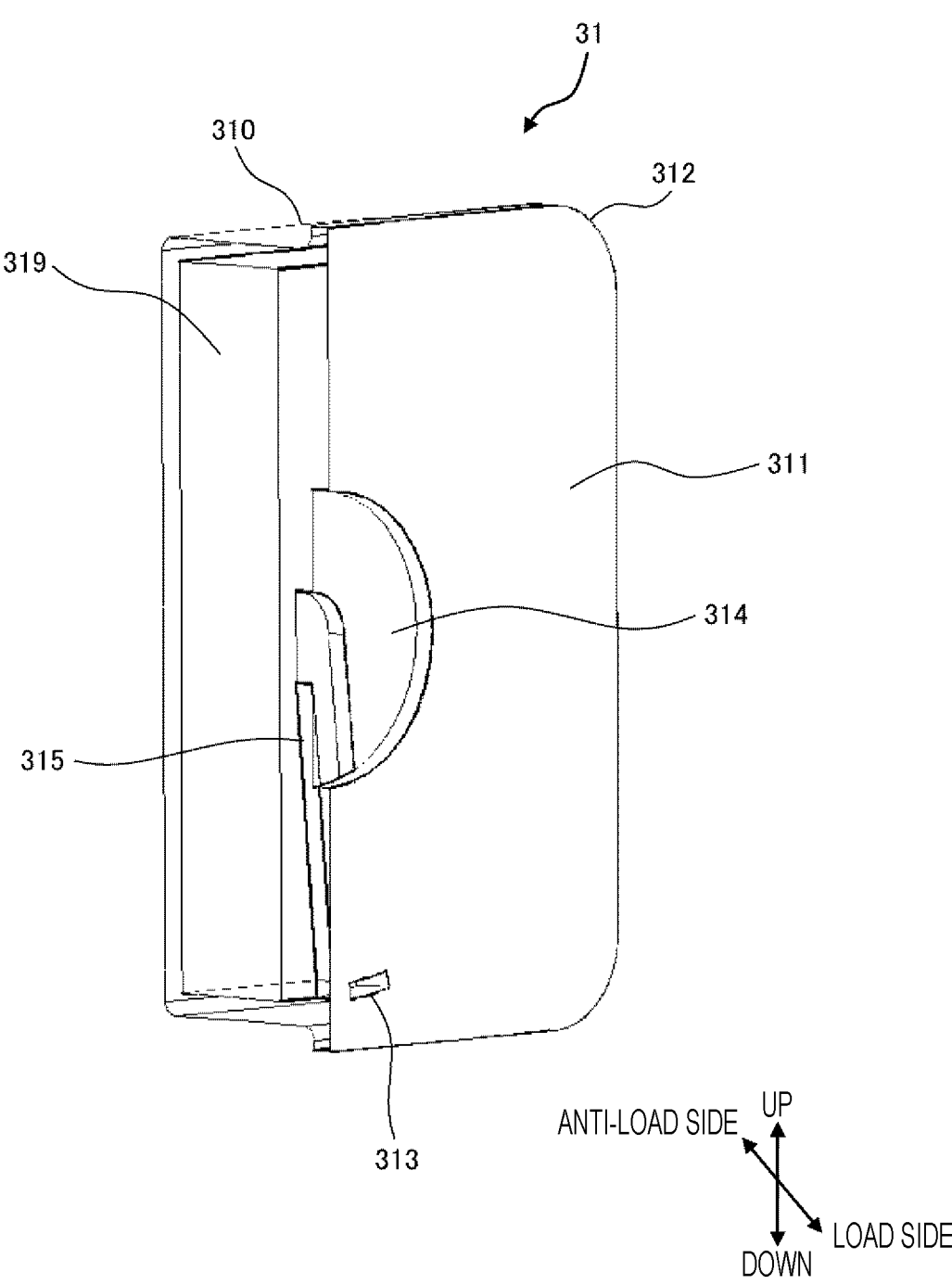
FIG. 9 is a cross-sectional perspective view of FIG. 8 taken along an up-down direction.

FIG. 2 is an external perspective view of the e-Axle unit according to the embodiment of the present invention when as viewed from the anti-load side. FIG. 3 is a cross-sectional perspective view taken along line III-III of FIG. 2. FIG. 4 is a cross-sectional perspective view of FIG. 3 as viewed from the load side. FIG. 5 is a cross-sectional view taken along line III-III of FIG. 2. Note that FIGS. 3 and 4 illustrate a state in which a motor cover, a stator, a rotor, and a rotor shaft are shifted to the right side in the axial direction (load side). FIG. 6 is a perspective view of a motor housing according to the embodiment of the present invention as viewed from an open side. FIG. 7 is a perspective view of the motor housing according to the embodiment of the present invention as viewed from a motor housing bottom side. FIG. 8 is an external perspective view of an inverter unit according to the embodiment of the present invention as viewed from the load side. FIG. 9 is a cross-sectional perspective view of FIG. 8 taken along an up-down direction.

As illustrated in FIG. 2, the e-Axle unit 3 includes a motor unit 30, an inverter unit 31, and a transmission mechanism unit 32. The e-Axle unit 3 in the present embodiment functions as a vehicle driving device.

As illustrated in FIGS. 3 to 5, the motor unit 30 includes a stator 301 and a rotor 302 that is rotatably supported on an inner peripheral side of the stator 301. The stator 301 includes a stator core 3010 and a stator coil 3012. The rotor 302 includes a rotor shaft 303 that rotates together with the rotor 302.

An outer periphery of the stator 301 is covered by a motor housing 34. The motor housing 34 accommodates the stator 301 and the rotor 302. The motor housing 34 is formed in a bottomed cylindrical shape in which the load side, which is one side in the axial direction, is opened, and the open side is covered by a motor cover 35. The anti-load side of the motor housing 34 is closed by a motor housing bottom portion 36 formed integrally with the motor housing 34. The motor cover 35 and the motor housing bottom portion 36 are provided with bearings 37 and 38 that rotatably support the rotor shaft 303.

The transmission mechanism unit 32 includes a speed reducer 321. The speed reducer 321 is fixed to the rotor shaft 303, and transmits a driving force of the motor unit to the vehicle through the speed reducer 321 to drive the vehicle.

An outline of the inverter unit 31 is formed by an inverter housing 310 of which the load side, which is one side in the axial direction, is opened, and an open portion on the load side is closed by an inverter cover 311. An inverter that supplies power to the motor unit 30 is accommodated in the inverter housing 310. The inverter housing 310 is provided in the motor housing 34 through the inverter cover 311.

A first flange portion 341 extending in the direction perpendicular to the axial direction is formed on the axially load side of the motor housing 34, and a second flange portion 342 extending in the direction perpendicular to the axial direction is formed on the axially anti-load side.

A third flange portion 351 of the motor cover 35 is disposed to face the first flange portion 341 of the motor housing 34, and the open portion on the load side of the motor housing 34 is closed by the motor cover 35.

A fourth flange portion 312 of the inverter unit 31 is disposed to face the second flange portion 342 of the motor housing 34. As a result, the inverter cover 311 is disposed to face the motor housing bottom portion 36.

A coolant introduction port 343 for introducing a coolant into the motor unit 30 is formed in an upper portion of the motor housing 34. In addition, coolant release ports 344a and 344b for releasing the coolant in the motor unit 30 are formed in a lower portion of the motor housing 34. Note that, in the present embodiment, one coolant introduction port 343 and two coolant release ports 344a and 344b are formed.

A first projecting portion 352 that has an annular shape and projects toward the motor housing 34 side (anti-load side) is formed in the motor cover 35. An annular cooling flow path 353 (first cooling flow path) that has a groove shape and through which the coolant flows is formed in the first projecting portion 352. In addition, a coolant introduction communication port 354 that communicates with the coolant introduction port 343 is formed in the first projecting portion 352. When the open portion of the motor housing 34 on the load side is closed by the motor cover 35, the first projecting portion 352 presses the stator core 3010 in the axial direction. In addition, when the stator core 3010 is pressed by the first projecting portion 352, a surface on a side opposite to the first projecting portion 352 (anti-load side) is pressed by a second projecting portion 346.

The annular cooling flow path 353 (first cooling flow path) is continuously formed in an annular shape, and the lowermost portion is closed by a closing portion 355. A coolant release communication port 356 that communicates with the coolant release port 344a is formed in the closing portion 355. The coolant release communication port 356 is formed to penetrate the first projecting portion 352 in the up-down direction, and communicates with an accommodation space 345 of the stator 301 and the rotor 302. On the other hand, the coolant introduction communication port 354 does not penetrate the first projecting portion 352 and does not communicate with the accommodation space 345.

In addition, the first projecting portion 352 is provided with a gasket 357 that has an annular shape and suppresses the leakage of the coolant when coming into contact with the stator 301. The gasket 357 is disposed on an inner peripheral side of the annular cooling flow path 353 (first cooling flow path).

As illustrated in FIGS. 3 to 6, the second projecting portion 346 that projects toward the open side (load side) is formed in the motor housing bottom portion 36 (motor housing 34). An annular cooling flow path 347 (third cooling flow path) through which the coolant flows is formed in the second projecting portion 346.

The annular cooling flow path 347 (third cooling flow path) is continuously formed in an annular shape, and the lowermost portion is closed by a closing portion 348. A coolant release communication port 349 that communicates with the coolant release port 344b is formed in the closing portion 348.

In addition, the second projecting portion 346 is provided with a gasket 3410 that has an annular shape and suppresses the leakage of the coolant when coming into contact with the stator 301. The gasket 3410 is disposed on an inner peripheral side of the annular cooling flow path 347 (third cooling flow path).

In addition, as illustrated in FIG. 7, two (a plurality of) bottom through-ports 361 that communicate with the annular cooling flow path 347 (third cooling flow path) are formed in the motor housing bottom portion 36 (motor housing 34). The bottom through-port 361 is disposed at a position that does not overlap with the coolant release communication port 349.

A bearing opening 362 in which a bearing 38 that holds the rotor shaft 303 is disposed is formed at a central portion of the motor housing bottom portion 36 (motor housing 34).

As illustrated in FIGS. 3 and 4, a part of the rotor shaft 303 is hollow, and a rotor cooling flow path 304 (fifth cooling flow path) through which the coolant flows is formed therein. The rotor shaft 303 on the opposite side in the axial direction (load side) where the rotor cooling flow path 304 is formed is solid.

As illustrated in FIGS. 8 and 9, a plurality of inverter cover through-ports 313 that communicate with a plurality of bottom through-ports 361 formed in the motor housing bottom portion 36 are formed in the inverter cover 311 of the inverter unit 31. An inverter 319 that drives an electric motor is accommodated in the inverter unit 31.

An insertion opening 314 into which an end portion of the rotor 302 is inserted is formed at a central portion of the inverter cover 311. In addition, two connection flow paths 315 (fourth coolant flow paths) formed in an inverted V-shape are provided on the anti-load side of the inverter cover 311. One of the connection flow paths 315 is connected to the plurality of inverter cover through-ports 313, and the other is opened toward the insertion opening 314. Then, the other of the connection flow paths 315 communicates with the rotor cooling flow path 304 (fifth cooling flow path) of the rotor shaft 303 in a state where the rotor shaft 303 is inserted into the insertion opening 314. An oil seal 316 is disposed at an end portion of the rotor shaft 303 connected to the connection flow path 315 to suppress the leakage of the coolant.

The coolant release port 344b for releasing the coolant to the outside is located between the two connection flow paths 315.

In the annular cooling flow path 347 (third cooling flow path), the coolant is collected downward by gravity, and the collected coolant passes through the plurality of bottom through-ports 361 and the plurality of inverter cover through-ports 313. The coolant that has passed through these ports passes through the two connection flow paths 315 and is sent to the rotor cooling flow path 304 of the rotor shaft 303.

In the present embodiment, the connection flow path 315 is provided inside the inverter housing 310, and the connection flow path 315 may be provided in a space formed by the motor unit 30 (motor housing bottom portion 36) or the inverter housing 310 with the motor housing 34. Since at least a part of the connection flow path 315 is provided inside the inverter housing 310 or in a space formed by the inverter housing 310 and the motor housing 34, the inverter can exchange heat with the coolant, and it is possible to efficiently cool the inverter unit and the motor unit.

Figure 10:
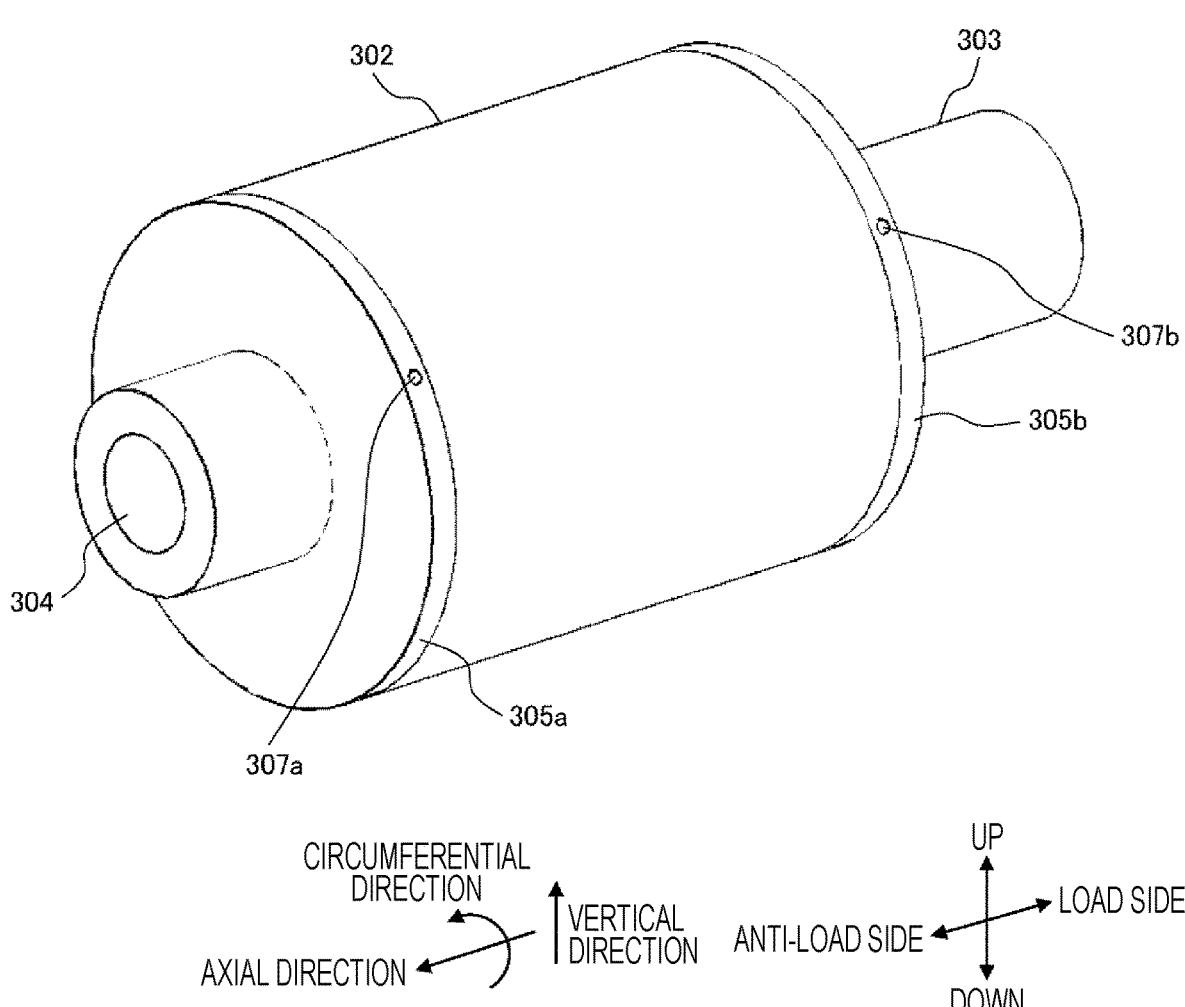
FIG. 10 is an external perspective view of a rotor according to the embodiment of the present invention as viewed from the anti-load side.
Figure 11:
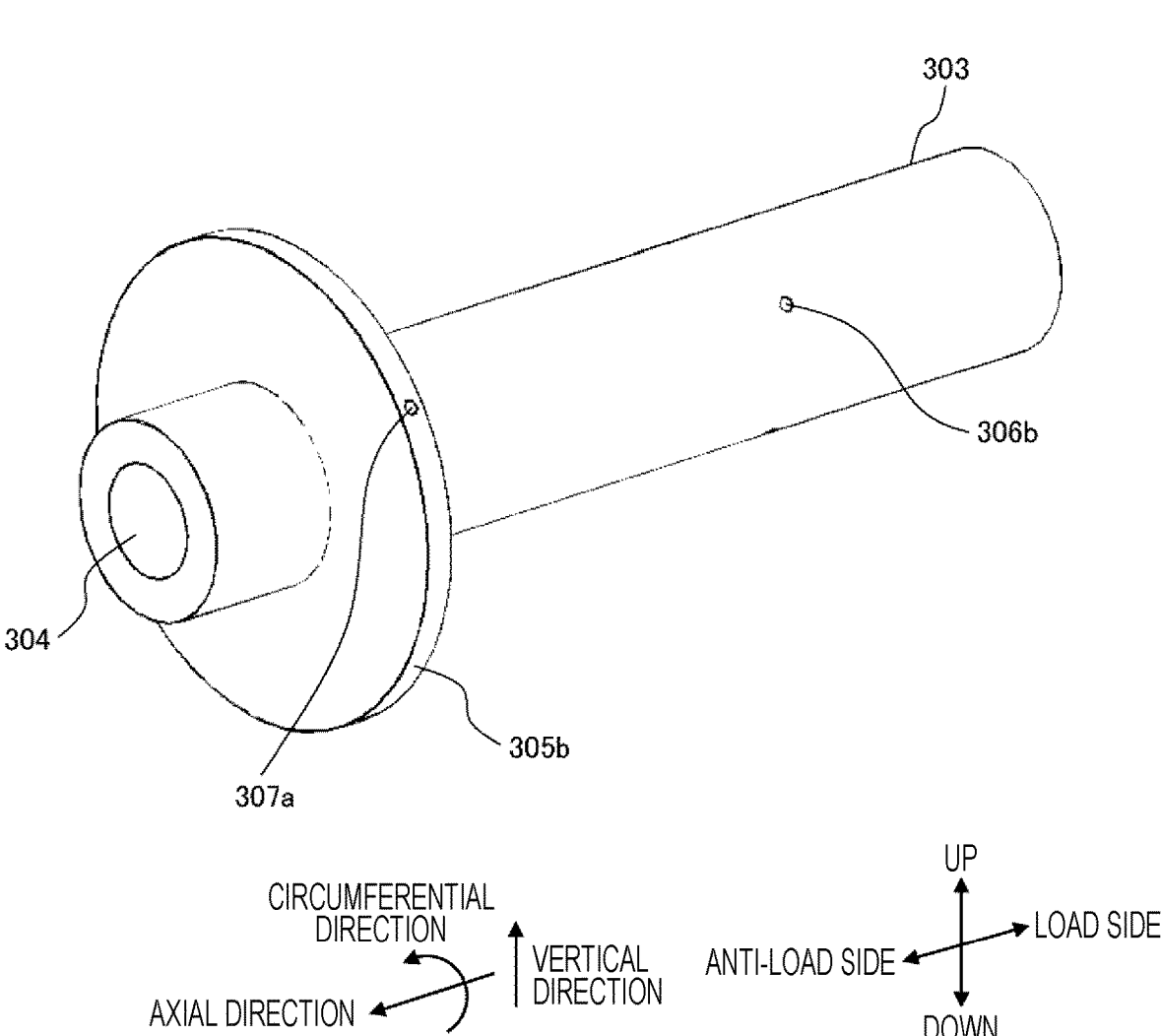
FIG. 11 is an external perspective view of a rotor shaft according to the embodiment of the present invention as viewed from the anti-load side.

FIG. 10 is an external perspective view of the rotor according to the embodiment of the present invention as viewed from the anti-load side. FIG. 11 is an external perspective view of the rotor shaft according to the embodiment of the present invention as viewed from the anti-load side.

The rotor 302 is provided with the rotor shaft 303 and end members 305a and 305b disposed at both end portions of the rotor shaft 303. The end members 305a and 305b are disposed to suppress jumping out of a plurality of permanent magnets (not illustrated) disposed in the rotor 302, in the axial direction. Note that FIG. 11 illustrates a state in which the rotor 302 and one end member 305b are removed.

A plurality of coolant discharge ports 306a and 306b that communicate with the rotor cooling flow path 304 are formed on an outer periphery of the rotor shaft 303. For example, four coolant discharge ports 306a and 306b are arranged to be shifted by 90 degrees in the circumferential direction of the rotor shaft 303. In addition, the coolant discharge ports 306a and 306b are disposed at two places in the axial direction in accordance with the positions of the end members 305a and 305b. As a result, a total of eight coolant discharge ports 306a and 306b are provided in the rotor shaft.

A plurality of discharge flow paths 307a and 307b (sixth cooling flow paths) are formed in the end members 305a and 305b to communicate with the plurality of coolant discharge ports 306a and 306b. The discharge flow paths 307a and 307b communicate with the rotor cooling flow path 304 through the coolant discharge ports 306a and 306b.

Figure 12:
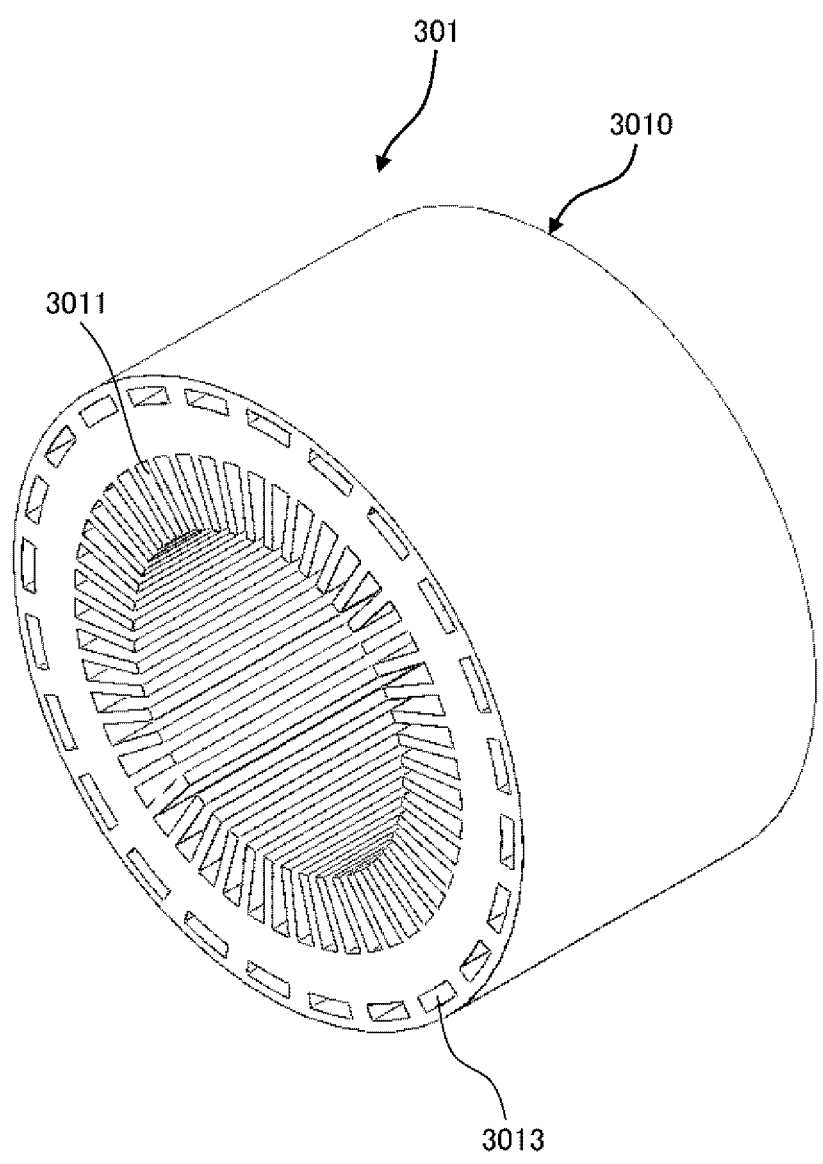
FIG. 12 is an external perspective view of a stator according to the embodiment of the present invention.
Figure 12:
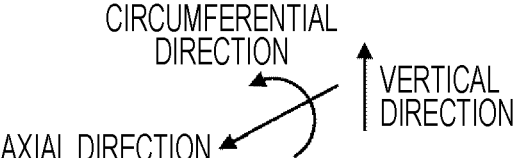

Next, the configuration of the stator will be described. FIG. 12 is an external perspective view of the stator according to the embodiment of the present invention.

The stator 301 includes the stator core 3010 that forms an outline of the stator 301, and a plurality of slots 3011 that are formed to open from an outer peripheral side toward an inner peripheral side of the stator core 3010 and into which the stator coils 3012 (See FIGS. 3 and 4) are inserted. Further, in the stator core 3010, a plurality of stator cooling flow paths 3013 (second cooling flow paths) are formed on an outer peripheral side of the slots 3011. The stator cooling flow path 3013 is formed to penetrate the stator core 3010 in the axial direction. In addition, the plurality of stator cooling flow paths 3013 have the same cross-sectional shape perpendicular to the axial direction and are arranged at equal intervals in the circumferential direction.

In a state where the stator 301 is inserted into the motor housing 34 and the open portion of the motor housing 34 is closed by the motor cover 35, the stator cooling flow path 3013 communicates with the annular cooling flow path 353 (first cooling flow path) and the annular cooling flow path 347 (third cooling flow path). The stator cooling flow path 3013 communicates with the coolant introduction port 343 through the annular cooling flow path 353.

Figure 13:
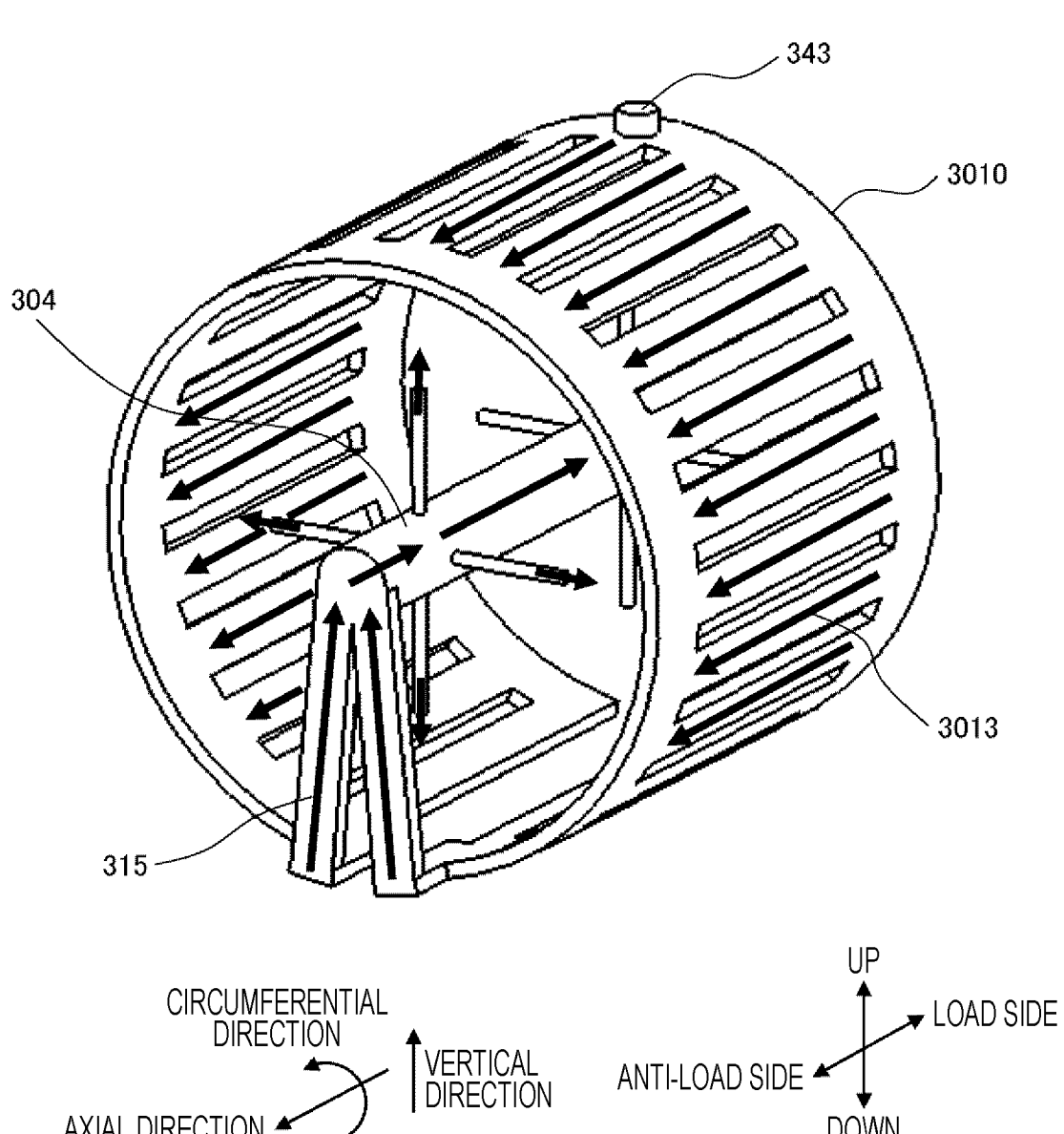
FIG. 13 is a schematic view illustrating a flow of a coolant according to the embodiment of the present invention.

Next, a flow path configuration of the coolant will be described with reference to FIGS. 3 to 13. FIG. 13 is a schematic view illustrating a flow of the coolant according to the embodiment of the present invention.

A pump provided in the oil cooler 4 (FIG. 1) is connected to the coolant introduction port 343, and the coolant is pressure-fed by the pump. As described below, the coolant introduced from the coolant introduction port 343 passes through the annular cooling flow path 353 (first cooling flow path), the stator cooling flow path 3013 (second cooling flow path), the annular cooling flow path 347 (third cooling flow path), the connection flow path 315 (fourth coolant flow path), the rotor cooling flow path 304 (fifth cooling flow path), and the discharge flow paths 307a and 307b (sixth cooling flow path), and then the coolant is released from the coolant release ports 344a and 344b.

The coolant press-fed by the pump flows into the motor unit 30 from the coolant introduction port 343 disposed in the upper portion of the motor housing 34. The coolant that has flowed into the motor unit 30 flows along the annular cooling flow path 353 (first cooling flow path) having an annular shape. Then, the coolant flows into the stator cooling flow path 3013 (second cooling flow path) that communicates with the annular cooling flow path 353 (first cooling flow path). The plurality of stator cooling flow paths 3013 are provided in the circumferential direction of the stator core 3010. Since the coolant is pressurized by the pump, the coolant uniformly flows through the plurality of stator cooling flow paths 3013 regardless of the upper and lower positions.

The gasket 357 having an annular shape is provided between the motor cover 35 and the stator core 3010. In the present embodiment, the gasket 357 is provided in the first projecting portion 352. The gasket 357 having an annular shape presses the stator core 3010 to suppress the leakage of the coolant from the connection between the annular cooling flow path 353 (first cooling flow path) and the stator cooling flow path 3013 (second cooling flow path), and When passing through the stator cooling flow path 3013, the coolant takes heat generated by the stator 301 and cools the stator 301.

The coolant that has passed through the plurality of stator cooling flow paths 3013 (second cooling flow paths) flows into the annular cooling flow path 347 (third cooling flow path) having an annular shape. The circulation of the coolant flowing through the annular cooling flow path 347 is promoted by gravity, and the coolant flows to the lower portion of the annular cooling flow path 347. That is, the terminal of each of the plurality of stator cooling flow paths 3013 is located at the lower portion.

The coolant that has flowed to the lower portion of the annular cooling flow path 347 passes through the bottom through-port 361 formed in the motor housing bottom portion 36 and the inverter cover through-port 313 formed in the inverter cover 311, and then flows into the two connection flow paths 315 (fourth coolant flow paths) formed in an inverted V-shape. The inlet (upstream side) of the connection flow path 315 is disposed below the coolant introduction port 343 in the vertical direction. The inlet (upstream side) of the connection flow path 315 communicates with the terminal of each of the stator cooling flow paths 3013 through the annular cooling flow path 347 (third cooling flow path), the bottom through-port 361, and the inverter cover through-port 313. When viewed in relation to the coolant introduction port 343, the terminal of each of the plurality of stator cooling flow paths 3013 is connected to the inlet (upstream side) of the connection flow path 315 at a position that is opposite to the coolant introduction port 343 in the axial direction (anti-load side) and opposite to the coolant introduction port 343 in the circumferential direction (lower side).

The coolant that has flowed into the connection flow path 315 rises in the connection flow path 315. The coolant passing through the connection flow path 315 takes away heat generated by the inverter 319 in contact with the connection flow path 315, and the coolant cools the inverter 319.

The coolant that has passed through the connection flow path 315 flows into the rotor cooling flow path 304 (fifth cooling flow path). The connection flow path 315 connects the stator cooling flow path 3013 and the rotor cooling flow path 304. The rotor cooling flow path 304 includes the coolant discharge ports 306a and 306b for discharging the coolant to an outer side of the rotor 302 in the radial direction, in accordance with the rotational movement of the rotor 302.

The coolant that has flowed to the rotor cooling flow path 304 passes through the coolant discharge ports 306a and 306b, and then is discharged into the accommodation space 345 from openings of the discharge flow paths 307a and 307b. As described above, the coolant that has passed through the respective flow paths and has flowed in from the coolant introduction port 343 is discharged from the openings of the discharge flow paths 307a and 307b into the accommodation space 345. Since the end portion of the rotor shaft 303 on the opposite side (load side) to the connection flow path 315, in the axial direction, is solid, the coolant does not leak from the end portion in the axial direction.

When the rotor 302 is rotated, the coolant discharged from the openings of the discharge flow paths 307a and 307b increases in flow velocity due to the centrifugal pump effect, is discharged into the accommodation space 345 of the motor housing 34, and hits the stator coil 3012. The coolant efficiently hits the stator coil 3012, takes heat from the stator coil 3012, and cools the stator coil 3012.

The coolant discharged into the accommodation space 345 of the motor housing 34 passes through the coolant release communication ports 356 and 349 and is released from the coolant release ports 344*a* and 344*b*, respectively. The coolant discharged from the coolant release ports 344*a* and 344*b* flows through the pipe 5 (FIG. 1), reaches the chiller 6, is cooled by the traveling air, and is guided to the oil cooler 4. In this manner, the coolant circulates in the e-Axle unit 3 and cools the devices in the e-Axle unit 3.

In the present embodiment, the coolant introduction port 343 is located at the upper portion of the motor unit 30, is connected to the stator cooling flow path 3013 (second cooling flow path), and also serves as the terminal of the annular cooling flow path 347 (third cooling flow path). The bottom through-port that communicates with the inlet of the connection flow path 315 is located at the lower portion of the motor unit 30. That is, the coolant introduction port 343 and the terminal of the annular cooling flow path 347 are disposed at symmetrical positions with respect to the rotor shaft 303: the circumferential direction. As a result, it is possible to equalize the pressure loss in the plurality of stator cooling flow paths 3013 and to suppress the drift of the coolant during circulation of the coolant due to the centrifugal pump effect in which the coolant is discharged by the rotation of the rotor 302.

According to the present embodiment, since the terminal of the stator cooling flow path 3013 and the rotor cooling flow path 304 are connected through the connection flow path 315, it is possible to promote the flow of the coolant in the entire stator cooling flow path by the centrifugal pump effect due to the rotation of the rotor 302.

In addition, according to the present embodiment, since the terminal of each of the plurality of stator cooling flow paths 3013 is connected to the inlet (upstream side) of the connection flow path 315 at the position on the opposite side (anti-load side) of the coolant introduction port 343 in the axial direction and on the opposite side (lower side) in the circumferential direction, it is possible to equalize the pressure loss of the stator cooling flow path 3013 and to suppress the drift, and it is possible to improve the cooling performance of the stator 301.

According to the present embodiment, since the upstream side of the connection flow path 315 is disposed below the coolant introduction port 343 in the vertical direction, it is possible to promote the flow of the coolant by gravity, and it is possible to improve the cooling performance.

Figure 14:
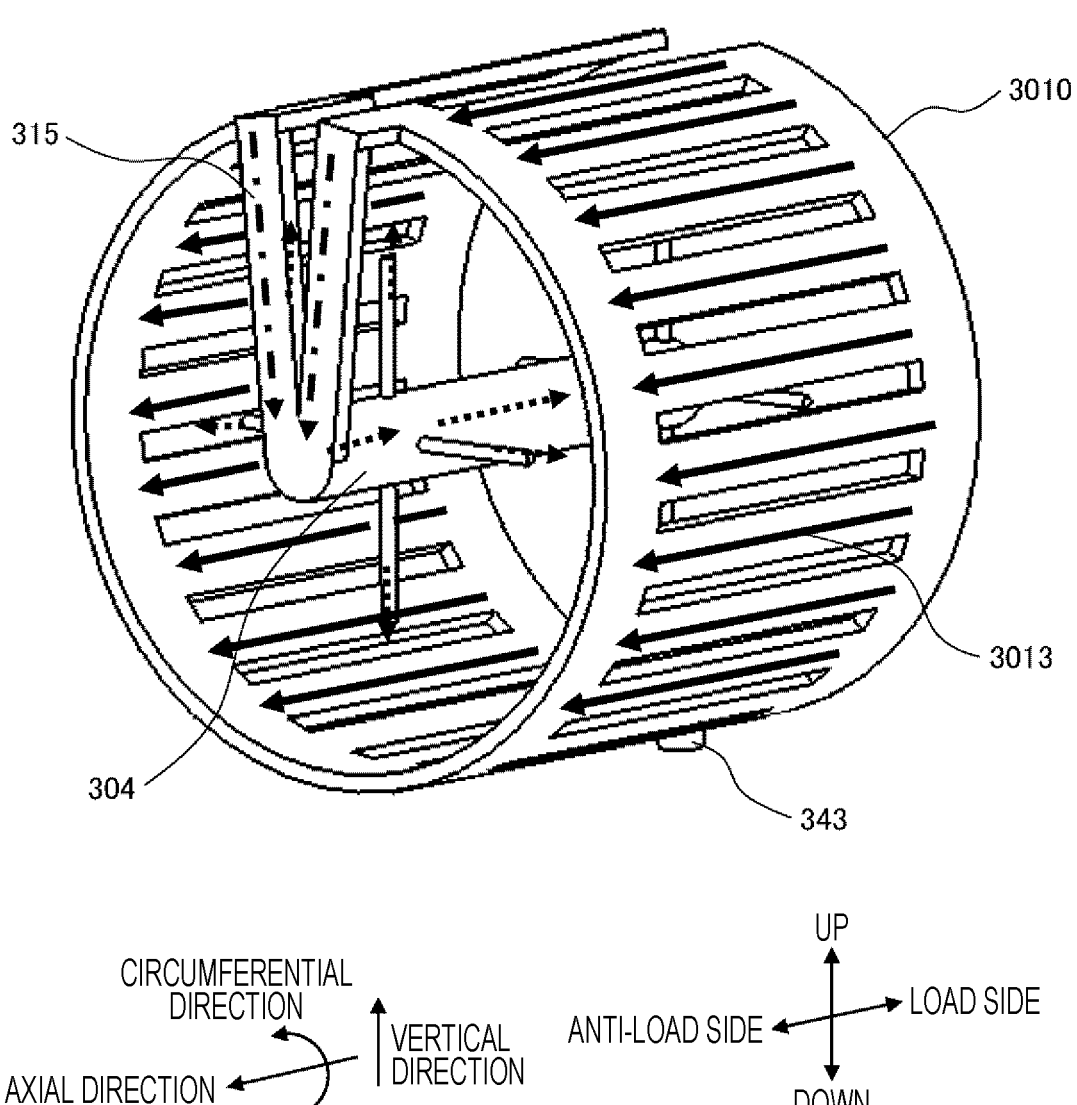
FIG. 14 is a schematic view illustrating a flow of a coolant according to another embodiment of the present invention.

In the present embodiment described above, the inlet (upstream side) of the connection flow path 315 is disposed below the coolant introduction port 343 in the vertical direction, and the present invention is not limited to this configuration. For example, the configuration as illustrated in FIG. 14 may be made. FIG. 14 is a schematic view illustrating the flow of the coolant according to another embodiment of the present invention.

In FIG. 14, the coolant introduction port 343 is located on the lower side in the vertical direction, and the inlet (upstream side) of the connection flow path 315 is located on the upper side in the vertical direction. That is, the coolant introduction port 343 is located below the upstream side of the connection flow path 315 in the vertical direction. In FIG. 14, since the coolant introduction port 343 is located on the lower side in the vertical direction, it is possible to reduce the pressure loss from the accommodation space 345 (FIG. 5) of the motor unit 30 to the coolant introduction port 343. Since the coolant discharged into the accommodation space 345 is accumulated on the lower side of the accommodation space 345 by gravity, the coolant release port only needs to be formed at any position.

Note that, the present invention is not limited to the above-described embodiment, and various modifications may be provided. The above-described embodiment is described in detail in order to explain the present invention in an easy-to-understand manner, and the above embodiment is not necessarily limited to a case including all the described configurations.

REFERENCE SIGNS LIST

1 vehicle body
2 wheel
3 e-Axle Unit
4 oil cooler
5 pipe
6 chiller
30 motor unit
31 inverter unit
32 transmission mechanism unit
34 motor housing
35 motor cover
36 motor housing bottom portion
37, 38 bearing
301 stator
3010 stator core
3011 slot
3012 stator coil
3013 stator cooling flow path (second cooling flow path)
302 rotor
303 rotor shaft
304 rotor cooling flow path (fifth cooling flow path)
305*a*, 305*b* end member
306*a*, 306*b* coolant discharge port
307*a*, 307*b* discharge flow path
310 inverter housing
311 inverter cover
312 fourth flange portion
313 inverter cover through-port
314 insertion opening
315 connection flow path (fourth coolant flow path)
316 oil seal
319 inverter
321 speed reducer
341 first flange portion
342 second flange portion
343 coolant introduction port
344*a*, 344*b* coolant release port
345 accommodation space
346 second projecting portion
347 annular cooling flow path (third cooling flow path)
348 closing portion
349 coolant release communication port
3410 gasket
351 third flange portion
352 first projecting portion
353 annular cooling flow path (first cooling flow path)
354 coolant introduction communication port
355 closing portion
356 coolant release communication port
357 gasket
361 bottom through-port
362 bearing opening

The invention claimed is:
1. A rotary electrical machine comprising:
a stator;
a rotor; and
a cooling flow path through which a coolant for cooling the stator and the rotor flows, wherein the cooling flow path includes a coolant introduction port into which the coolant is introduced, a stator cooling flow path that is formed in a stator core of the stator and communicates with the coolant introduction port, a rotor cooling flow path formed inside the rotor, and a connection flow path connecting the stator cooling flow path and the rotor cooling flow path, the rotor cooling flow path includes a coolant discharge port for discharging the coolant to an outer side of the rotor in a radial direction in accordance with rotational movement of the rotor, a plurality of the stator cooling flow paths are disposed in a circumferential direction of the stator core, and a terminal of each of the plurality of stator cooling flow paths is connected to an upstream side of the connection flow path at a position that is opposite to the coolant introduction port in an axial direction and opposite to the coolant introduction port in the circumferential direction.

2. The rotary electrical machine according to claim 1, wherein the upstream side of the connection flow path is disposed below the coolant introduction port in a vertical direction.

3. The rotary electrical machine according to claim 2, wherein two connection flow paths are formed, and a coolant release port for releasing the coolant to an outside is disposed between the two connection flow paths.

4. The rotary electrical machine according to claim 1, wherein the coolant introduction port is disposed below the upstream side of the connection flow path in a vertical direction.

5. The rotary electrical machine according to claim 1, wherein the stator cooling flow paths have the same cross-sectional shape that is perpendicular to the axial direction and are arranged at equal intervals in the circumferential direction.

6. The rotary electrical machine according to claim 1, wherein a pump is connected to the coolant introduction port, and the coolant is pressure-fed by the pump.

7. The rotary electrical machine according to claim 1, wherein the rotor cooling flow path is formed inside a rotor shaft, and an oil seal is provided at an end portion of the rotor shaft connected to the connection flow path.

8. The rotary electrical machine according to claim 7, wherein an end portion of the rotor shaft, which is opposite to the connection flow path, in the axial direction is solid.

9. The rotary electrical machine according to claim 1, further comprising a motor housing that accommodates the stator and the rotor, wherein the motor housing is formed in a bottomed cylindrical shape in which one side in the axial direction is opened, an open side of the motor housing is covered by a motor cover, and a protrusion that presses the stator core in the axial direction is formed in the motor cover when the open side of the motor housing is closed.

10. The rotary electrical machine according to claim 9, wherein a gasket that suppresses leakage of the coolant is disposed between the motor cover and the stator core.

11. The rotary electrical machine according to claim 9, wherein the motor housing is provided with an inverter housing that accommodates an inverter, and at least a part of the connection flow path is provided inside the inverter housing or in a space formed by the inverter housing and the motor housing.

12. A vehicle driving device that includes a stator, a rotor, a rotor shaft provided in the rotor, and a speed reducer fixed to the rotor shaft, and drives a vehicle through the speed reducer, the vehicle driving device comprising the rotary electrical machine according to claim 1.

\* \* \* \* \*